April 1, 1969 KAISAKU FUJIWARA 3,436,003

TAPE SUPPLY SYSTEM

Filed June 15, 1967

INVENTOR

KAISAKU FUJIWARA

BY Paul M. Craig, Jr.

ATTORNEY 3,436,003
TAPE SUPPLY SYSTEM
Kaisaku Fujiwara, Odawara-shi, Japan, assignor to Hitachi, Ltd., Tokyo, Japan, a corporation of Japan
Filed June 15, 1967, Ser. No. 646,253
Claims priority, application Japan, Sept. 16, 1966, 41/60,816
Int. Cl. B65h 17/32
U.S. Cl. 226—97 2 Claims

ABSTRACT OF THE DISCLOSURE

A tape supply system adapted for use with a magnetic tape or a paper tape apparatus, in which a cylindrical rotary body having an outer diameter slightly smaller than the width of the cavity in a tape loop storage vacuum column is rotatably and movably disposed in said vacuum column for trailing a tape therearound, whereby tapes of different widths or punched tapes can be handled without requiring a complicate mechanism.

*Background of the invention*

The present invention relates to a tape supply system and more particularly to vacuum column units for the storage of tape loop adapted for use with recording and regenerating apparatus using a magnetic tape or paper tape.

In magnetic tape or paper tape supply system, a tape is driven by a forwarding capstan or a reversing capstan so as to pass through a recording and reading head located intermediate between said capstans. These capstans serve to accelerate or decelerate or reverse the tape very quickly between two points where tape loops are stored respectively. However, an electric motor to drive a supply reel and a take-up reel cannot be set in motion so quickly as desired due to inertia of said reels and the tape wound thereon. Therefore, power to be supplied to said reel motor is controlled by a servomechanism in such a manner that the physical size of the tape loop in the vacuum storage column be maintained within a limited range. Conventionally, where a completely or a half punched paper tape is to be used or where magnetic tapes or paper tapes of different widths are to be handled by the same tape supply system, it has been difficult to control the size of the tape loop, because a large amount of air passed through the perforations in the tape or leaked through the gaps formed between the inner side walls of the vacuum column and both edges of the tape.

It has, therefore, been customary for obtaining an optimum size of tape loop, to adjust the distance between the front and back plates of the vacuum column at each time when a tape of different width is to be used, or to adjust the amount of air to be sucked from the vacuum column in accordance with the number of perforations in a punched tape to be used. However, either method has required the mechanism for practicing the same to be complicate and costly.

*Summary of the invention*

According to the present invention, there is provided a tape supply system which is capable of handling tapes of different widths and air-permeable punched tapes and which is characterized by a cylindrical rotary body disposed in a tape loop storage vacuum column, said cylindrical rotary body having an outer diameter slightly smaller than the width of the cavity in said vacuum column and being adapted to move integrally with the tape trailed therearound.

It is, therefore, an object of the present invention to provide an improved tape supply system which is capable of handling and supplying under control tapes of different widths and air-permeable punched tapes.

It is another object of the present invention to provide an improved tape supply system which is simple in construction and low in cost.

The present invention will be described in further detail hereinbelow with reference to the accompanying drawings in which the present invention is illustrated by way of example as adapted to handle air-permeable punched paper tapes.

*Description of the preferred embodiment*

Figures 1, 2:
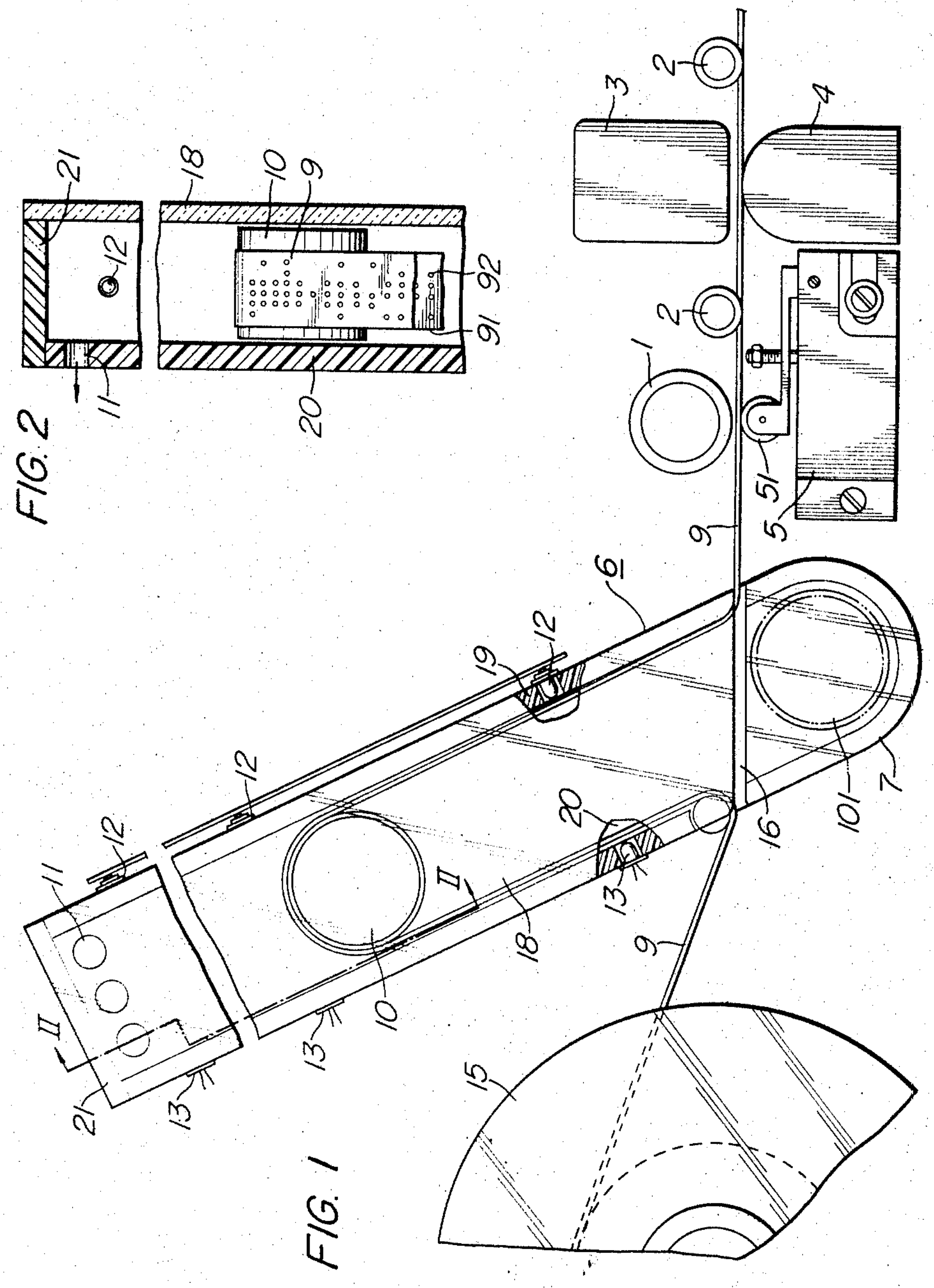
FIGURE 1 is a front elevation, partly in section, of a tape supply system embodying the present invention and parts associating therewith.
FIGURE 2 is a cross section taken on the line II—II of FIGURE 1.

Referring to the drawings, a capstan roller 1 is rotating continuously in one direction. The width of each tape guide 2 is adjustable freely so as to coincide with the width of a tape to be processed, whereby it is possible to prevent the tape from travelling zigzag when it passes through photoelectric elements 3 and 4. From the practical standpoint, it is only sufficient for the width of the tape guide 2 to be adjustable, for instance, to 1 inch, 7/8 inch and 11/16 inch, which are the widths of the tapes being commonly used at the present time.

A pressure roller assembly 5 comprises a pressure roller 51. This pressure roller 51 is operated by the action of an electromagnet so as to compress a tape 9 between it and the capstan roller 1, enabling said tape 9 to be advanced in a desired direction by said capstan roller.

Designated at 6 is a tape loop storage vacuum column of the tape supply system, which is composed of side walls 19, a back plate 20, an upper wall 21, a bottom structure 7 which simultaneously serve as a stopper for a cylindrical rotary body 10 disposed in said vacuum column, and a transparent front plate 18 which is divided into two sections at a slit 16, all of said members composing the vacuum column being connected together in a substantially air-tight relation. The back plate 20 is formed in the upper portion thereof with air suction ports 11 which are in communication with a vacuum pump not shown.

The outer diameter of the cylindrical rotary body 10 is so determined that the tape 9 trailed around said cylindrical rotary body may be spaced somewhat from the respective adjacent side walls 19 of the vacuum column 6 as shown in FIG. 1, so as to permit air to leak through the gaps thus formed in a small amount but at a constant rate. The cylindrical rotary body 10 rests in the bottom structure 7 of the tape loop storage vacuum column 6 as at 101 under the gravity when air in the vacuum column is not sucked by the vacuum pump and, under this state, the tape 9 is passed through the aforementioned tape reader and mounted in the vacuum column 6 through the slit 16. The tape 9 is wound on a reel 15. As the air is discharged from the vacuum column through the air suction ports 11, the cylindrical rotary body as at 101 is pulled longitudinally of the vacuum column 6 while trailing the tape 9. Thus, it will be appreciated that the tape 9 trailed around the rotary body 10 travels while rotating said rotary body.

The relative position of the cylindrical rotary body 10, tape 9, and the back plate 20 and transparent front plate 18 of the vacuum column, to each other, is shown in FIG. 2. From this figure, it will be clearly seen that air leakage in the vacuum column is maintained constant owing to the presence of the cylindrical rotary body 10 and thereby it is possible to control the tape loop, even when the width of the tape 9 is smaller than the distance between the inner walls of the back plate 20 and the front plate 16 or the tape 9 is permeable to air due to the perforations therein.

The cylindrical rotary body 10 which constitutes the characteristic feature of the present invention, is made, for example, of aluminum or plastics, so that it may be suitably light in weight.

The tape loop formed in the vacuum column 6 is sensed in the known manner by a group of light source lamps 12 and a group of photoelectric conversion elements 13 (which are totally referred to as a tape position detector) provided in the opposite side walls 19 respectively, and the resulting electric signal is given to the reel motor through a reel motor control amplifier to control the same, whereby the tape loop is controlled. A problem arising here is that, where the tape is punched, light from the light source lamps passes through the perforations in the two parallel sections of the tape moving towards and away from the rotary body, and is sensed by the respective photoelectric conversion elements which should not sense such light. Such a problem may, however, be solved in the manner described below. Namely, as described previously, the tapes being commonly used in these days consist of three types having a width of 1 inch, ⅞ inch, and $^{11}/_{16}$ inch, and these tapes are common in the distance between the sprocket holes and one edge of the tape. In the present invention, by making use of such feature of the tapes, the position of the tape 9 travelling in the vaccum column 6 is controlled by the adjustable tape guides 2 described earlier. Describing in more detail, the tape 9 is made to travel in the vacuum column 6, with its one edge 91 being held at a constant distance from the inner wall of the back plate 20, and the tape position detector is arranged in a line in which the sprocket holes 92 of the tape travel. With the arrangement described, it will be readily understood that light from the light sources lamps passes through the tape in a constant amount as the sprocket holes are perforated in a regularly spaced relation, and further that the amount of light is less than that in the absence of the light-intercepting article, that is the tape. Therefore, by cutting at that level, the undesirable sensing of the light can be avoided. The method described above is not restrictive but any other method may alternatively be employed.

Although, in the embodiment described and illustrated herein, the slit through which the tape is inserted into the vacuum column is provided in the lower portion and the air suction ports are provided in the upper portion of said vacuum column, such relative position may be reversed without adversely affecting the perform of the system. In this case, however, it is necessary to provide a change-over switch on the vacuum pump, so that air be blown into the vacuum column to hold the cylindrical rotary body in the upper end portion of said vacuum column under air pressure to provide for mounting of the tape, before the air sucking operation is commenced.

Obviously, the tape supply system shown in FIG. 1 is only for the left-hand side tape reel and a similar system is likewise provided for the right-hand side tape reel.

As may be understood from the foregoing description, by employing the vacuum column having disposed therein the cylindrical rotary body according to the present invention, it is possible to obtain an improved tape supply system which singly is capable of controlling the supply of tapes of different widths as well as air-permeable punched tapes and which is simple in construction and low in cost.

What is claimed is:

1. A tape supply system comprising a substantially airtight tape loop storage vacuum column, a cylindrical rotary body disposed in said tape loop storage vacuum column for free rotation and longitudinal movement therein, and a tape position detector for detecting the position of a loop of tape trailed around said cylindrical rotary body.

2. A tape supply system according to claim 1, in which said tape loop storage vacuum column is formed in one end portion thereof with a slit which is slightly wider than the thickness of the tape and through which the tape is inserted into said vacuum column to be trailed around said cylindrical rotary body.

References Cited

UNITED STATES PATENTS

| | | | |
|---|---|---|---|
| 3,217,995 | 11/1965 | Sweeney | 226—97 X |
| 3,297,221 | 1/1967 | Licht et al. | 226—97 |

ALLEN N. KNOWLES, *Primary Examiner.*